United States Patent [19]

Brady

[11] Patent Number: 6,041,049

[45] Date of Patent: Mar. 21, 2000

[54] METHOD AND APPARATUS FOR DETERMINING A ROUTING TABLE FOR EACH NODE IN A DISTRIBUTED NODAL SYSTEM

[75] Inventor: James T. Brady, San Jose, Calif.

[73] Assignee: International Business Machines Corporation, Armonk, N.Y.

[21] Appl. No.: 08/852,019

[22] Filed: May 6, 1997

[51] Int. Cl.[7] ........................................................ H04J 1/16
[52] U.S. Cl. ........................... 370/351; 370/412; 370/428
[58] Field of Search ..................... 370/351, 395, 370/400, 257, 363, 367, 368, 371, 374, 378, 379, 383, 386, 396, 412, 428, 429; 340/825.06; 709/241; 707/10

[56] References Cited

U.S. PATENT DOCUMENTS

| | | | |
|---|---|---|---|
| 4,825,206 | 4/1989 | Brice, Jr. et al. | 370/216 |
| 4,914,571 | 4/1990 | Baratz et al. | 707/10 |
| 4,987,536 | 1/1991 | Humblet | 709/241 |
| 4,991,204 | 2/1991 | Yamamoto et al. | 370/351 |
| 5,049,873 | 9/1991 | Robins et al. | 340/825.06 |
| 5,051,987 | 9/1991 | Conlin | 370/400 |
| 5,093,824 | 3/1992 | Coan et al. | 370/257 |
| 5,453,979 | 9/1995 | Schibler et al. | 370/395 |
| 5,477,536 | 12/1995 | Picard et al. | 370/400 |
| 5,488,608 | 1/1996 | Flammer, III | 370/400 |
| 5,699,358 | 12/1997 | Festl et al. | 370/351 |
| 5,705,998 | 1/1998 | Stampfl | 370/400 |

*Primary Examiner*—Dang Ton
*Assistant Examiner*—Tuan Q Ho
*Attorney, Agent, or Firm*—Ohlandt, Greeley, Ruggiero & Perle

[57] ABSTRACT

A method enables each node in a multi-nodal network to construct a routing table to all other nodes in the network. Each "home" or originating node performs a method which includes the steps of: transmitting a query to all immediate neighbor nodes and recording in a routing table, responses received which identify the neighbor node at the terminus of each link; transferring to each neighbor node, home node routing table entries and receiving routing table entries from each neighbor node; and, for each routing table entry to a node that is received from a neighbor node, if the route indicator is already present in the home node routing table, ignoring the entry; if the new entry indicates a route to a new node, entering the new node and a route identifier; and if the entry indicates a route to a node for which there is already an entry in the home node routing table, noting the new entry as a lower priority route to the node. Once the aforementioned procedure is repeated a number of times, each node in the multi-nodal network includes routes to all nodes in the network, with the routes having automatically been prioritized in accordance by sequence of receipt.

7 Claims, 3 Drawing Sheets

N5 ROUTE TABLE

|    | P1 | P2 | P3 | ... |
|----|----|----|----|-----|
| N1 |    |    |    |     |
| N2 | U  |    |    |     |
| N3 |    |    |    |     |
| N4 | L  |    |    |     |
| N5 |    |    |    |     |
| N6 | R  |    |    |     |
| N7 |    |    |    |     |
| N8 | D  |    |    |     |
| N9 |    |    |    |     |

N2 ROUTE TABLE

|    | P1 | P2 | P3 | ... |
|----|----|----|----|-----|
| N1 | L  |    |    |     |
| N2 |    |    |    |     |
| N3 | R  |    |    |     |
| N4 |    |    |    |     |
| N5 | D  |    |    |     |
| N6 |    |    |    |     |
| N7 |    |    |    |     |
| N8 |    |    |    |     |
| N9 |    |    |    |     |

N1 ROUTE TABLE

|    | P1 | P2 | P3 | ... |
|----|----|----|----|-----|
| N1 |    |    |    |     |
| N2 | R  |    |    |     |
| N3 |    |    |    |     |
| N4 | D  |    |    |     |
| N5 |    |    |    |     |
| N6 |    |    |    |     |
| N7 |    |    |    |     |
| N8 |    |    |    |     |
| N9 |    |    |    |     |

|    | N1 | N2 | N3 | N4 | N5 | N6 | N7 | N8 | N9 |
|----|----|----|----|----|----|----|----|----|----|
| N1 |    | L  |    | U  |    |    |    |    |    |
| N2 | R  |    | L  |    | U  |    |    |    |    |
| N3 |    | R  |    |    |    | U  |    |    |    |
| N4 | D  |    |    |    | L  |    | U  |    |    |
| N5 |    | D  |    | R  |    | L  |    | U  |    |
| N6 |    |    | D  |    | R  |    |    |    | U  |
| N7 |    |    |    | D  |    |    |    | L  |    |
| N8 |    |    |    |    | D  |    | R  |    | L  |
| N9 |    |    |    |    |    | D  |    | R  |    |

FIRST EXCHANGE

FIG.3

N5 ROUTE TABLE

|    | P1    | P2    | P3   |
|----|-------|-------|------|
| N1 | U(2)  | L(4)  |      |
| N2 | U     | (L)   |      |
| N3 | U(2)  | R(6)  |      |
| N4 | L     |       |      |
| N5 |       |       |      |
| N6 | R     |       |      |
| N7 | D(8)  | L(4)  |      |
| N8 | D     | (L)   | (R)  |
| N9 | R(6)  | D(8)  |      |

FIG.4a

N4 ROUTE TABLE

|    |    |
|----|----|
| N1 | U  |
| N2 | U  |
| N3 |    |
| N4 |    |
| N5 | R  |
| N6 |    |
| N7 | D  |
| N8 | D  |
| N9 |    |

FIG.4b

N6 ROUTE TABLE

|    |    |
|----|----|
| N1 |    |
| N2 |    |
| N3 | U  |
| N4 |    |
| N5 | L  |
| N6 |    |
| N7 |    |
| N8 | D  |
| N9 | D  |

FIG.4c

METHOD AND APPARATUS FOR DETERMINING A ROUTING TABLE FOR EACH NODE IN A DISTRIBUTED NODAL SYSTEM

FIELD OF THE INVENTION

This invention relates to a reconfigurable multi-nodal network and, more particularly, to a system and method for enabling each node in such a network to rapidly determine the topology of the network and to construct routing tables for the network, without requiring any preloaded information regarding the network's topology.

BACKGROUND OF THE INVENTION

Each node in a multi-nodal network must maintain a consistent view of the network's topology in order to enable inter-nodal communications. Further, the topology observed by each node must be able to be updated, when a topology change occurs, such as when a node fails or a node or link is either added to or subtracted from the network.

The prior art has suggested various methods for enabling nodes in a multi-nodal network to maintain knowledge of the network's topology. U.S. Pat. No. 4,914,571 to Baratz et al. describes a multi-node system wherein a requesting node first determines which resources reside within itself and then, if desired resources are not found, searches resources that are known to a server node which reside elsewhere in the network. The search then continues (if the requested resource is not found)) to all associated nodes, etc.

U.S. Pat. No. 4,987,536 to Humblet provides a system for determining a shortest path from a starting node to a destination node. The system enables each node to form a routing tree and to communicate that routing tree to each adjacent node. Modifications to the routing tree are then made in accordance with information from adjacent nodes.

U.S. Pat. No. 5,049,873 to Robins et al. describes a system for gathering status information regarding a communications network, wherein a monitor node maintains topology data for the network. A method for updating the topology information is described.

U.S. Pat. No. 5,051,987 to Conlin describes a multi-node network wherein each node accesses information relating to a then-current network topology and transmits a message with respect thereto through appropriate connecting links. During an update state, each node interrogates each neighboring node regarding nodes which neighbor it. The process continues until all nodes have returned information regarding their neighboring nodes, thus enabling each node's topology to be updated.

Coan et al. in U.S. Pat. No. 5,093,824 describes a multi-nodal network wherein each node stores a precomputed configuration table that corresponds to each of a plurality of possible network topologies which can result from a number of possible failure events. When such a failure event occurs, the precomputed configuration corresponding to the failure event is accessed and used for intra-node communication control.

In general, the above-noted prior art requires that each node have at least some information regarding immediate neighbor nodes and, in certain instances, requires a pre-loading of initial topology information from a centralized source.

In U.S. patent application Ser. No. 08/531,724 to Liang et al. (assigned to the same Assignee as this Application), each node in a multi-node network determines network topology without having previous information as to the topology. The procedure employed by the Liang et al. system comprises three phases:

1. Self-positioning—each node determines what connections exist to its immediate neighbor nodes, if any. Based on message exchanges during this phase, a node constructs an entry about itself in an otherwise empty topology table within the node.

2. Connecting—each node tells other nodes in the network about itself, and conversely, finds out what other nodes are in the network. This is accomplished by each node sending to "all nodes" the topology about itself (i.e., an update message). This also includes iterative forwarding of each node's "topology row" throughout the network. Redundant traffic is avoided by each interim node forwarding the information only when it differs from the contents of its topology table. If the row contents match, meaning the message has been seen before, the message is discarded. At the end of this phase, the node's topology table contains an entry for each node in the network and each node's topology table is identical.

3. Adjusting—This phase occurs when changes are detected about nodes or links between nodes and enables a calculation to build the individual nodes' routing and topology tables.

While the Liang et al. procedure and system enables overall system topology to be determined, it does not include an easy method for determining preferred versus non-preferred routes between connected nodes. More specifically, a topology discovery method and system should have an ability to determine a shortest path between nodes without being required to enter a calculation phase, after all nodal path responses have been received.

Accordingly, it is an object of this invention to provide an improved method and apparatus for determining the topology of a multi-nodal system.

It is a further object of this invention to provide an improved system and method for discovery of a multi-nodal system topology which enables preferred routes to be discovered and discriminated vis a vis non-preferred routes.

SUMMARY OF THE INVENTION

A method enables each node in a multi-nodal network to construct a routing table to all other nodes in the network. Each "home" or originating node performs a method which includes the steps of: transmitting a query to all immediate neighbor nodes and recording in a routing table, responses received which identify the neighbor node at the terminus of each link; transferring to each neighbor node, home node routing table entries and receiving routing table entries from each neighbor node; and, for each routing table entry to a node that is received from a neighbor node, if the route indicator is already present in the home node routing table, ignoring the entry; if the new entry indicates a route to a new node, entering the new node and a route identifier; and if the entry indicates a route to a node for which there is already an entry in the home node routing table, noting the new entry as a lower priority route to the node. Once the aforementioned procedure is repeated a number of times, each node in the multi-nodal network includes routes to all nodes in the network, with the routes having automatically been prioritized in accordance by sequence of receipt.

BRIEF DESCRIPTION OF THE DRAWINGS

FIG. 3 is a compilation of routing tables for each of nodes N1–N9 after the first exchange of routing tables therebetween.

FIG. 4a illustrates the state of the routing table of node N5, after a second exchange of data, and illustrates how the sequence of receipt of route information enables a prioritizing of routes between nodes.

FIG. 4b illustrates additions to the routing table of node N5 from node N4, after a third exchange of data.

FIG. 4c illustrates additions to the routing table of node N5 from node N6, after a third exchange of data.

DETAILED DESCRIPTION OF THE INVENTION

Figures 1, 2A, 2B, 2C:
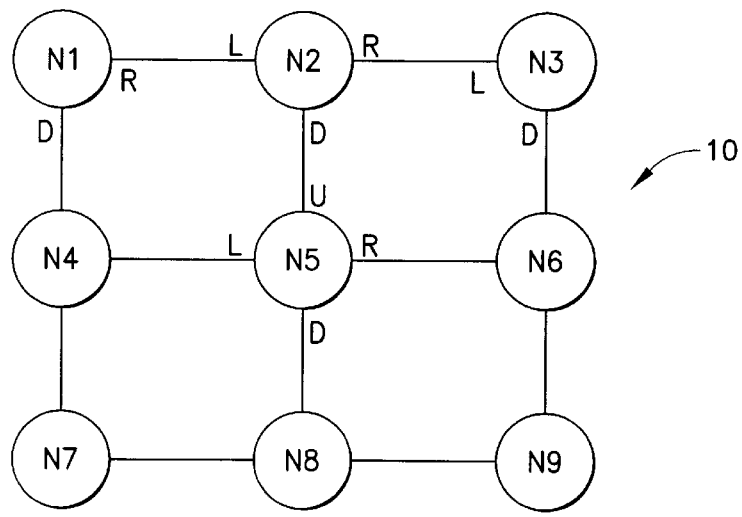
FIG. 1 is a diagram of an exemplary multi-nodal system.
FIGS. 2a–2c are exemplary routing tables for nodes N5, N2, and N1, respectively, after an initial exchange with neighbor nodes.

FIG. 1 illustrates an exemplary multi-nodal network which comprises nine nodes N1–N9, each node connected to a neighbor node by a full duplex communication link. The individual links emanating from each node are denoted U (up); D (down); R (right); and L (left). Thus, node N5 is connected to node N2 via link U, to node N6 via link R; to node N8 via link D and to node N4 via link L. In similar fashion, node N2 is connected to node N5 via its link D; to node N3 via its link R, etc. Each link, as can thus be seen, identifies a connecting link to an adjacent node via the home node's "local" notation.

Each node includes a processor with resident memory that contains a procedure for implementing the topology discovery method to be considered below. Each node further includes a communication facility which enables full duplex communications with connected nodes. Hereafter, a node connected one link away from another node will be termed a "neighbor" node. Further, a node which initiates a message transfer will be termed a "home" node. Among other capabilities, each node also includes a timer facility for generating time-out events.

Figure 5:
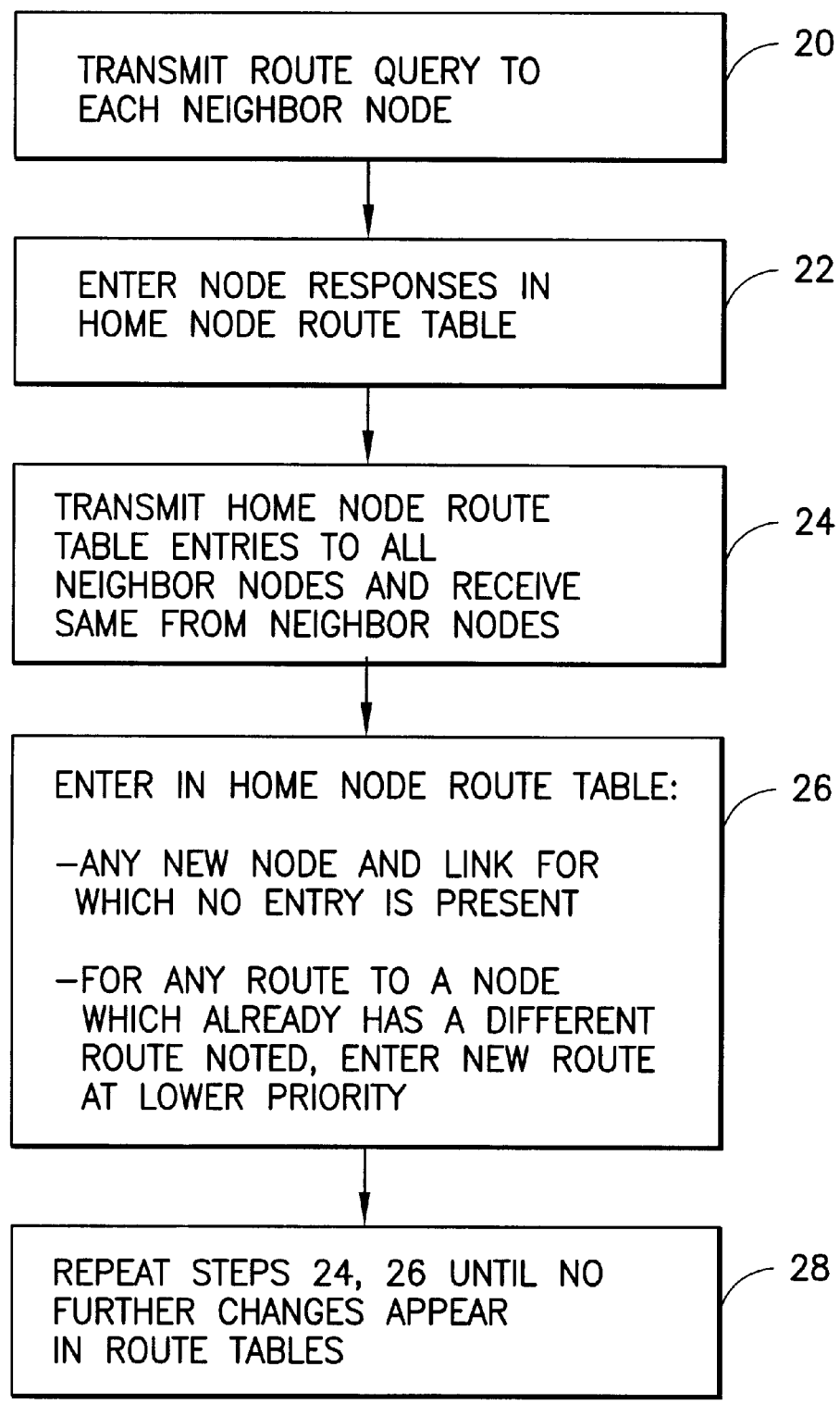
FIG. 5 is a logical flow diagram illustrating the procedure of the invention.

Turning to FIG. 5, the procedure followed by the individual nodes in FIG. 1 to fill out their respective route tables will be described, in conjunction with FIGS. 2–4. which illustrate the configuration of route tables during various phases of the procedure. Initially (box 20), each of nodes N1–N9 transmits a route query to each neighbor node. Thus, node N5 transmits route queries to each of nodes N2, N6, N8 and N4. In similar fashion, node N2 transmits route queries to nodes N1, N5 and N3, node N1 transmits route queries to nodes N2 and N4, etc., etc.

Thereafter, each neighbor node responds to the home node from which the route query originated, by transmitting a physical node identifier back to the home node. Clearly, if there is no node connected to a home node's link, no response is received and a time-out function causes entry of a null into the home node's route table for that link (box 22).

After this initial exchange, referring to FIG. 2a, the route table for node N5 includes entries for nodes N2, N4, N6 and N8 and identifies links to each of those nodes which emanate from node N5 (i.e., U, L, R and D, respectively). As shown in FIGS. 2b and 2c, similar entries are present in the route tables for nodes N2 and N1, respectively. Note that each route table includes priority columns (P1, P2, P3 . . . ) which, as will be seen from the description below, are filled in with route data in accord with the sequence in which the route information is received.

In FIG. 3, the state is illustrated of each of the route tables in nodes N1–N9, after the first exchange of data. At this stage, each node only knows of its immediately adjacent neighbor nodes. It is important to understand that even when all route tables are complete and indicate routes between respective nodes, that each route entry only indicates the link to the neighbor node which is the first step in the route. Thus if a message is dispatched to a destination node that is not a neighbor node, the message moves to a neighbor node (in accord with the route entry to the destination node in the home node's route table) and then determines from the route table in the neighbor node, the next link to take to proceed towards the destination node, etc., etc.

Referring back to FIG. 5 and box 24, after the first exchange of data, each home node transmits a copy of its entire route table to its neighbor nodes and receives all of the neighbor nodes' route tables. Then, each node (box 26) updates its route table as follows:

(1) if a link to a new node is noted in a received routing table from a respective neighbor node, for which there is no link entry present in the home node's routing table, a link entry to the respective neighbor node is made in the row corresponding to the new node, at the first priority column (P1);

(2) if a link to a node is noted in a received routing table (from a respective neighbor node) for which there is a link entry to another neighbor node present in the home node's routing table, a link entry to the respective neighbor node is made in the row corresponding to the node, at the next available priority column (e.g., P2); and (3) if an entry indicating a link to a destination node is present in a received routing table from a respective neighbor node, and a corresponding link to the respective neighbor node is already present (with respect to the destination node) in the home node's routing table, that entry is discarded.

FIG. 4a illustrates the state of the route table of node N5 after it has received route tables from nodes N2, N6, N8 and N4 (i.e., after the second exchange of route data). The parenthetical number after the link identifier indicates the node from which the route was received. Thus, when node N5 receives a route table of node N2, it sees an L link entry for node N1. That entry indicates that it is the left link of node N2 which connects to node N1. However, node N5 knows that to get to node N1 via node N2, it must communicate over its upper link U. As a result, upper link U is inserted into the P1 priority column of node NS's route table, at the row corresponding to node N1.

When node NB receives the route table from node N4, it also sees a route to node Ni from the U entry therein. Accordingly, node N5 inserts link L (to node N-4) in its routing table as the route to follow to node N1. Note that both route entries to node Ni, from nodes N4 and N2, were received in the same exchange of information. Under such a circumstance, either route entry can be placed in the P1 priority column of the table, with the remaining entry going into the P2 column. To prevent an overloading of any one link, a random number procedure is utilized to assign priorities to concurrently received link routes to a same destination node.

Upon the third exchange of route table information, node N5, for example, receives updated data from nodes N4 and N6. The route data from node N4 (see FIG. 4b) includes link information from node N4 to nodes N1, N2, N5, N7 and N8. The route data from node N6 (see FIG. 4c) includes route information to nodes N3, N5, N8 and N9. As can be seen from FIG. 1, the link from node N5 to node N4 is link L and to node N6 is link R.

Comparing first the link data from node N4 to the entries already present in node N5's route table, an L route is already present for node N1 therein, so the N4/N1 entry is ignored (where N4/N1 designates an N1 link entry in the N4 route table). The N4/N2 entry is new to node N5 causing an L designation (circled in FIG. 4a) to be entered in the P2 column at the row corresponding to node N2. The N4/N5 entry is ignored. The N4/N7 entry is also ignored as there is already an L link present in the node N5 route table. The N4/N8 entry is new to node N5 causing an L designation (circled in FIG. 4a) to be entered in the P2 column at the row corresponding to node N8.

Comparing next, the link data from node N6 to the entries already present in node N5's route table, an R route is already present for node N3 therein, so the N6/N3 entry is ignored. The N6/N5 entry is ignored. The N6/N8 entry is new to node N5 causing an R designation (dashed circle in FIG. 4a) to be entered in the P3 column at the row corresponding to node N8. Note that the L and R entries in priority columns P2, P3 of FIG. 4a could be reversed as both the N4 and N6 route tables are received on the same exchange of tables. Lastly, the N6/N9 entry is also ignored as there is already an R link present in the node N5 route table.

Thereafter, exchanges of route tables continue until no further changes are experienced in the home node route tables (box 28), at which point the procedure terminates. As the number of exchanges of route tables is directly dependent upon the number of nodes in the multi-nodal network, the number of exchanges required can be precalculated so as to assure that each route table is complete at the end of the procedure.

As can be seen from the above, the information received about a node over a given link with respect to other links, is received in the order of the shortest path to the node to a longest path to that node. This facility differs from the prior art which assumes that the topology must be known in order to compute the routing table. The method of the invention takes advantage of a natural, highly parallel computation that is performed during topology discovery and replaces the computation that must take place serially in each node in the prior art.

It should be understood that the foregoing description is only illustrative of the invention. Various alternatives and modifications can be devised by those skilled in the art without departing from the invention. For instance, this invention may be implemented by either hardware in each node or via software loaded into a node via a disk memory, with the disk memory controlling a local processor present in each home node to perform the routing table updates and routing table transfers. Further, it is to be understood that the tables in the FIGS. are shown for illustration purposes and that the actual data structures will appear altogether different, when viewed as they are stored. Accordingly, the present invention is intended to embrace all such alternatives, modifications and variances which fall within the scope of the appended claims.

I claim:

1. A method for enabling each node in a multi-nodal system to construct a route table to all other nodes in the multi-nodal system, each node being either a home node or a neighbor node which is positioned one link away from a home node, each home node performing the method comprising the steps of:
   a) transmitting a query to all immediate neighbor nodes, said query inquiring into an identity of each said neighbor node;
   b) recording in a route table, responses received from each said neighbor node, each said response identifying a neighbor node at a terminus of a link;
   c) transferring to each said neighbor node, route table entries from the home node's route table and receiving route table entries from each said neighbor node; and
   d) for each route entry to a destination node indicated by a route table entry received from a said neighbor node:
      1) ignoring said each route entry to said destination node if an identical link route is already present that corresponds to said destination node in the route table of the home node;
      2) entering a new route entry to said neighbor node if a route to said destination node is not present in the route table of the home node, and
      3) if said each route entry to said destination node indicates a route to a node for which there is already a different route entry in the route table of the home node, placing a further route entry to said neighbor node in the table of said home node as a lesser priority route to said destination node.

2. The method as recited in claim 1, wherein steps c) and d) are repeated until no further changes are experienced in entries in the route table of the home node.

3. The method as recited in claim 2, wherein said home node employs said route table to determine a path to a said neighbor node over which to transmit messages to said destination node, a priority value assigned to a path employed by said home node to determine which path to try before other paths in attempting to dispatch a message.

4. The method as recited in claim 1, wherein step d) includes the following substep of:
   4) if plural different route entries are received to said destination node, randomly choosing one of said different route entries as a higher priority route and another of said different route entries as a lower priority route.

5. A memory media for enabling each node in a multi-nodal system to construct a route table to all other nodes in the multi-nodal system, said each node being either a home node or a neighbor node which is positioned one link away from said home node, each said home node including a processor that is controlled by said memory media, said memory media comprising:
   a) means for controlling said processor to cause transmission of a query to all immediate neighbor nodes, said query inquiring into an identity of each said neighbor node;
   b) means for controlling said processor to record in said route table, responses received from each said neighbor node, said responses identifying the neighbor node at a terminus of a link;
   c) means for controlling said processor to transfer to each said neighbor node, route table entries from the home node's route table and to receive route table entries from each neighbor node; and
   d) means for controlling said processor to process each route entry to a destination node indicated by a route table entry received from said neighbor node by:
      1) ignoring said route entry to said destination node if an identical link route is already present that corresponds to said destination node in the route table of the home node;

2) entering a further route entry to said neighbor node if a route to said destination node is not present in the route table of the home node; or 3) if said route entry to said destination node indicates a route to a node for which there is already a different route entry in the route table of the home node, placing a further route entry to said neighbor node in the table of said home node as a lesser priority route to said destination node.

6. The memory media as recited in claim 5 wherein means c) and means d) repeat their respective functions until no further changes are experienced in entries in the route table of the home node.

7. The memory media as recited in claim 5, wherein means d) controls said processor to perform the following substep of:

4) if plural different route entries are received to said destination node, randomly choosing one of said different route entries as a higher priority route and another of said different route entries as a lower priority route.

* * * * *